United States Patent
Grunke et al.

(10) Patent No.: US 6,984,107 B2
(45) Date of Patent: Jan. 10, 2006

(54) TURBINE BLADE FOR THE IMPELLER OF A GAS-TURBINE ENGINE

(75) Inventors: Richard Grunke, Lohhof (DE); Lothar Peichl, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 271 days.

(21) Appl. No.: 10/351,873

(22) Filed: Jan. 27, 2003

(65) Prior Publication Data

US 2003/0170120 A1 Sep. 11, 2003

(30) Foreign Application Priority Data

Jan. 25, 2002 (DE) .......................... 102 02 810

(51) Int. Cl.
*F01D 5/20* (2006.01)

(52) U.S. Cl. .................... 415/173.4; 415/174.4
(58) Field of Classification Search .............. 415/173.4, 415/174.4, 9

See application file for complete search history.

(56) References Cited

U.S. PATENT DOCUMENTS

| | | | |
|---|---|---|---|
| 3,519,282 A | | 7/1970 | Davis |
| 4,227,703 A | | 10/1980 | Stalker et al. |
| 4,589,823 A | | 5/1986 | Koffel |
| 4,671,735 A | * | 6/1987 | Rossmann et al. ........ 415/173.4 |
| 4,851,188 A | | 7/1989 | Schaefer et al. |
| 5,476,363 A | * | 12/1995 | Freling et al. ........... 415/173.4 |
| 5,551,840 A | | 9/1996 | Benoit et al. |
| 5,603,603 A | * | 2/1997 | Benoit et al. ............. 415/173.4 |
| 5,704,759 A | | 1/1998 | Draskovich et al. |
| 6,190,124 B1 | * | 2/2001 | Freling et al. ........... 415/174.4 |
| 6,434,876 B1 | * | 8/2002 | Wheat et al. ............... 427/203 |

* cited by examiner

*Primary Examiner*—F. Daniel Lopez
*Assistant Examiner*—Igor Kershteyn
(74) *Attorney, Agent, or Firm*—Kenyon & Kenyon

(57) ABSTRACT

In a turbine blade for a gas-turbine engine impeller, which is rotationally mounted in a housing, the turbine blade has a blade tip, a leading-edge positioned upstream in the direction of flow, and trailing edge positioned downstream, and includes a blade section, which has a section depth parallel to the direction of flow and a section thickness parallel to the direction of travel of the turbine blade. An abrasive coating, which has an effective length corresponding to the section thickness along the section depth, is applied to the blade tip, the abrasive coating of the blade tip brushing against an abrasion coating, which is introduced into the surrounding housing. Along the section depth, in particular in the region of the leading and trailing edges, the abrasive coating coming into contact with the abrasion coating has an effective length, which may always, continually or very frequently be greater, but at least equal to a predefined, minimum dimension.

19 Claims, 7 Drawing Sheets

TURBINE BLADE FOR THE IMPELLER OF A GAS-TURBINE ENGINE

CROSS-REFERENCE TO RELATED APPLICATIONS

The present application claims priority to Application No. 102 02 810.9, filed in the Federal Republic of Germany on Jan. 25, 2002, which is expressly incorporated herein in its entirety by reference thereto.

FIELD OF THE INVENTION

The present invention relates to a turbine blade for the impeller of a gas-turbine engine.

BACKGROUND INFORMATION

In order to keep gap losses affecting the efficiency of gas-turbine engines small, it may be necessary to keep the gap between the turbine blades rotating at high speed and the housing surrounding them small for as long as possible.

The gap dimension of this gap is known not to be constant, but is subject to changes during the different operating phases of the gas-turbine engine. Thus, among other things, the turbine blades experience elongation in the radial direction under high working loads, due to thermal stress and the acting centrifugal force. In addition, the housing surrounding the turbine blades has a different thermal reaction characteristic. All of this results in the gap-dimension changes to be observed.

In order to take into account these different thermal reaction characteristics of the turbine blade and surrounding housing and the demand for a small gap dimension between the blade tips and the housing, it is conventional that "contact" is allowed between the blade tips of the turbine blades and the surrounding housing. In order to prevent the blade tips of the turbine blades and the surrounding housing from being damaged in this case, a so-called abrasive coating is applied to the blade tips of the turbine blades, while the surrounding housing is coated with a corresponding wear or abrasion coating.

When the blade tip brushes against the abrasion coating introduced into the surrounding housing, the abrasive particles applied to the blade tip cut or rub into the abrasion coating and wear it away. At the same time, the abrasion of the abrasion coating is also associated with a certain amount of wear of the abrasive coating.

The wear of the abrasive coating applied to the blade tips of the turbine blades is a function of several factors, such as mating of material, temperature, rotational speeds, etc.

Rapid wear of the abrasive coating proves to be disadvantageous, since this leads, on one hand, to an increase in the gap between the blade tip and the surrounding housing, which, as described above, results in efficiency losses. On the other hand, the premature wear of the abrasive coating also means that the blade tips of the turbine blades are subject to premature wear themselves, i.e., practically ground down, which in turn leads to costly repairs of the blade tips and the shortening of the service life of the gas-turbine engine.

Using these findings as a starting point, it is an object of the present invention to provide corrective action, by redesigning the blade tips of a gas-turbine engine, in order to minimize the wear of the abrasive coating on-the blade tips, in particular in the region of the leading and trailing edges of the blade tips.

SUMMARY

The above and other beneficial objects of the present invention are achieved by providing a turbine blade as described herein.

Along section depth T, at the blade tip of the turbine blade, the measures of the present invention provide for effective length $D_A$ of the abrasive coating on the blade tip coming into contact with the abrasion coating, always, continually or very frequently being kept greater than, but at least equal to a predefined minimum dimension $D_{A,min}$, in particular in the region of the leading and trailing edges.

Tests have shown that, given otherwise constant conditions such as mating of materials, temperature, rotational speed, etc., effective length $D_A$ of the abrasive coating on the blade tip of the turbine blade may represent a critical quantity for the appearance and the degree of the abrasive-coating wear to be observed on the blade tip.

In this context, effective length $D_A$ of the abrasive coating corresponds to section thickness D of the blade tip measured in parallel to direction of travel L of the turbine blade.

If the blade tip has zones that do not carry any abrasive coating, e.g., depressions for blade cooling (cooling-air bores or so-called blade crown), then effective length $D_A$ of the abrasive coating is the sum of the corresponding partial lengths provided with abrasive coating.

Section thickness D of the blade section, and therefore effective length $D_A$ of the abrasive coating applied to the blade tip, vary according to the geometry of the blade section. Effective length $D_A$ of the abrasive coating on the blade tip tends to decrease in the region of the leading and trailing edges.

If effective length $D_A$ of the abrasive coating, and thus section thickness D at the blade tip, fall below a certain dimension, which is also designated below as $D_{A,min}$, then increased signs of abrasive-coating wear may be observed.

The theoretical explanation for the increased wear of the abrasive coating in the case of a short effective length $D_A$ of the abrasive coating is as follows: Each ablating point of the abrasive coating, e.g., each abrasive particle, produces a certain removal performance in the abrasion coating (liner) and is subjected, in return, to a certain amount of wear itself (individual wear). The lesser the number of ablating points arranged one behind the other with respect to direction of rotation L of the turbine blade, i.e., the lesser the section thickness D and therefore the lesser the effective length $D_A$ of the abrasive coating, the greater the individual removal performance that the individual point has to deliver, and therefore the greater the individual wear.

Tests have also shown that increased wear of the abrasive coating may be observed in the region of the leading and trailing edges.

Because of the dependency on many turbine-specific parameters, $D_{A,min}$ may not be a fixed quantity, but may be derived new for each turbine design. Since geometry dictates that section thickness D, and therefore effective length $D_A$ of the abrasive coating as well, be very small at the leading and trailing edges, $D_{A,min}$ may not be reached in these regions.

In a well-functioning system of a blade tip having an abrasive coating, and a surrounding abrasion coating (liner), the ablation of the abrasion coating (liner) may be markedly greater than the premature, unwanted, and undesirable wear of the abrasive coating.

The exceeding of predefined, minimum dimension $D_{A,min}$ of effective length $D_A$ of the abrasive coating on the blade tip, along section depth T with the aid of a flattened area in the region of the leading-and trailing edges parallel to direction of rotation L of the turbine blade, may provide that this flattened area may be established in a simple manner, so that the cutting of the blade tip into the abrasion coating (liner) along section depth T may only occur at or above an effective length of $D_A \geq D_{A,min}$. Therefore, it may be ensured that the regions susceptible to wear around the leading and trailing edges, which, according to the geometry of the blade section, only have a short effective length $D_A$, do not come into contact with the abrasion coating (liner). Therefore, the premature and undesirable wear of the abrasive coating in the region of the leading and trailing edges, and thus the wear of the blade tip itself, may be effectively prevented.

According to an example embodiment of the present invention, the exceeding of predefined, minimum dimension $D_{A,min}$ of effective length $D_A$ of the abrasive coating on the blade tip, along section depth T, through the provision of covering bands (microshrouds) locally bounded in direction of rotation L of the turbine blade, in the region of the leading edge and trailing edge, may provide that, with the aid of these covering bands, section thickness D at the blade tip is increased in these regions in a simple manner, which may correspond to a corresponding increase in effective length $D_A$. Premature wear may also be precluded by this measure.

The covering bands may not only be limited to the regions around the leading and trailing edges, but may be designed as covering bands (microshrouds) extending along the circumference of the blade section and locally bounded in direction of rotation L of the turbine.

If covering bands are provided for the present invention's exceeding of the predefined, minimum dimension $D_{A,min}$ of effective length $D_A$ of the abrasive coating on the blade tip, then the abrasive coating may be applied to the covering bands.

The requirement of the present invention that, on the blade tip, the relationship $D_A \geq D_{A,min}$ always apply to effective length $D_A$ of the abrasive coating, may also be implemented by combining the measures already described.

The present invention is described below in light of three exemplary embodiments that are schematically illustrated in the Figures.

DETAILED DESCRIPTION

Figure 1:
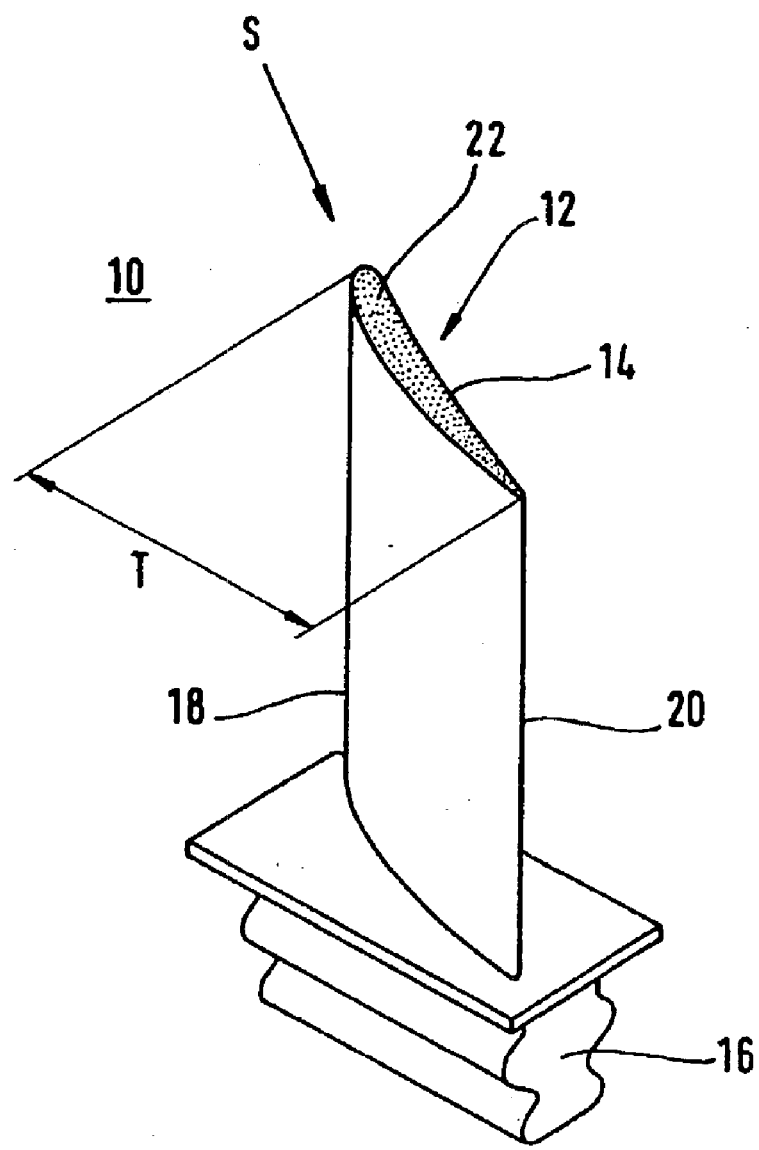
FIG. 1 is a perspective view of a turbine blade having an abrasive coating applied to the blade tip.

FIG. 1 is a schematic view of a turbine blade 10 for an impeller of a gas-turbine engine.

Turbine blade 10 has a blade tip 12 having a blade section 14, a blade base 16, a leading edge 18 that is upstream in direction of flow S, and a trailing edge 20 that is downstream in direction of flow S. At blade tip 12, blade section 14 has a section depth T parallel to direction of flow S.

An abrasive coating 22 is applied to blade tip 12. During operation, abrasive coating 22 may come into "contact" with a surrounding housing of the gas-turbine engine, via a so-called abrasion coating.

Figure 2:
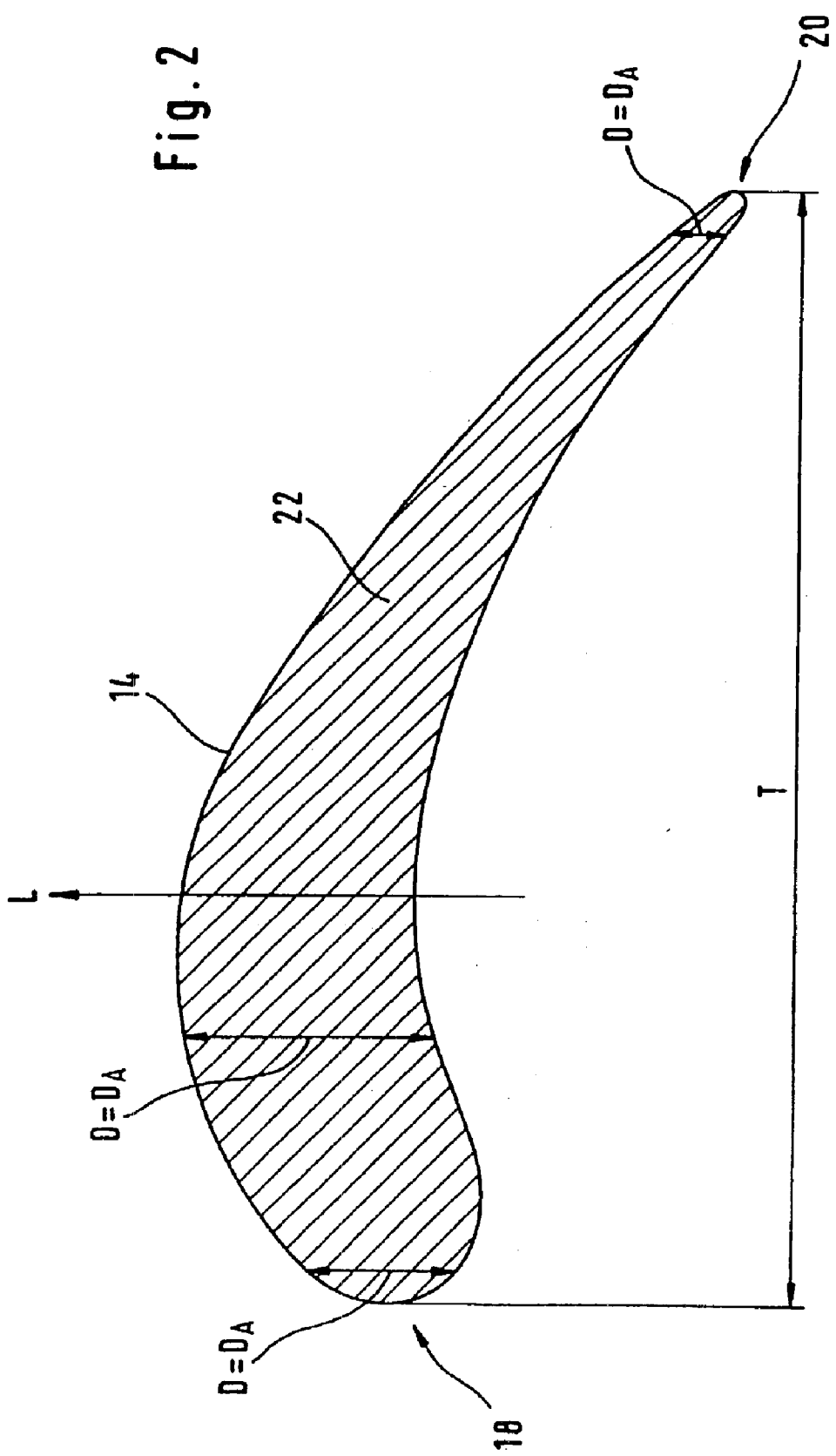
FIG. 2 is an enlarged view of the section of the turbine blade illustrated in FIG. 1.

FIG. 2 is an enlarged view of blade section 14 at blade tip 12 of turbine blade 10. Along section depth T, blade section 14 has different section thicknesses D in a direction parallel to so-called direction of travel L. Because of the section geometry, only a small section thickness D is present in the region of leading-edge 18 and trailing edge 20. As previously mentioned, abrasive coating 22 is applied to blade tip 12. In accordance with section thickness D, the abrasive coating has, on blade tip 12, a so-called effective length $D_A$ parallel to direction of travel L of turbine blade 10.

Figure 3:
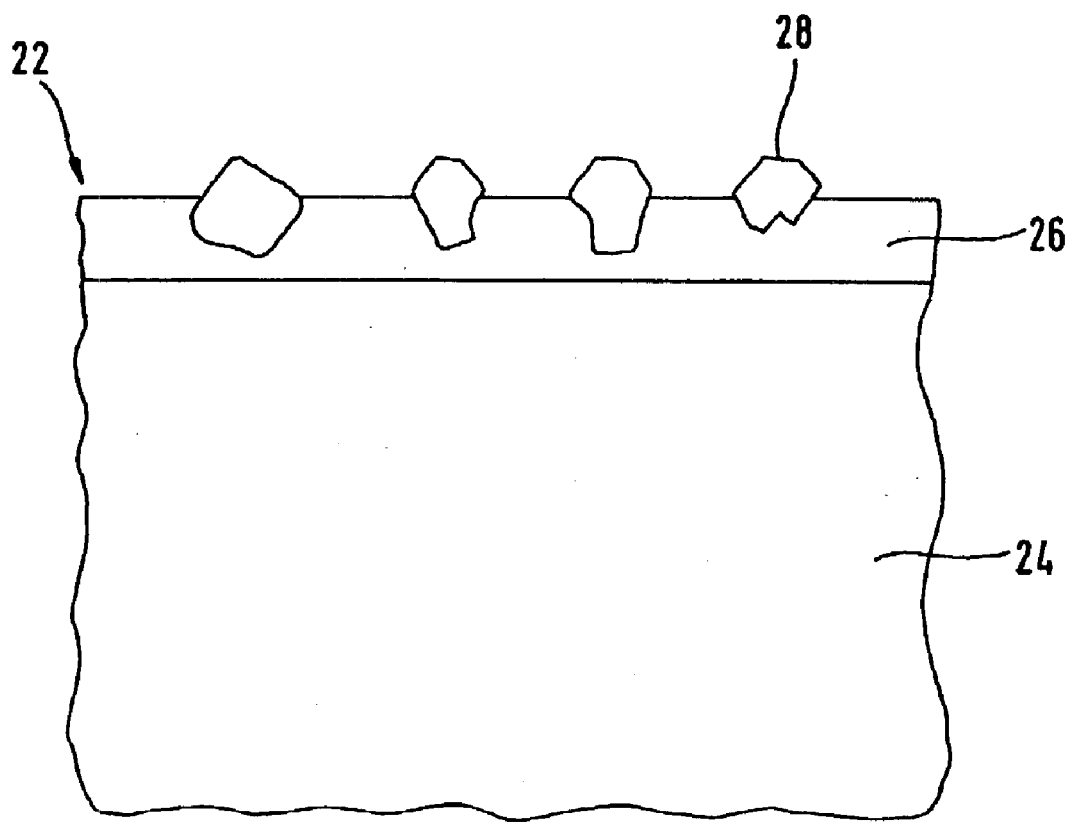
FIG. 3 is an enlarged representation of the abrasive coating in light of a sectional view parallel to direction of travel L of the section illustrated in FIG. 2.

For the purpose of illustrating abrasive coating 22, FIG. 3 illustrates blade section 14 in light of a sectional view parallel to direction of travel L. In addition to a blade base material 24, abrasive coating 22 is shown at blade tip 12. In the present exemplary embodiment, abrasive coating 22 is made up of a matrix (MCrAlY) 26 having intercalated or embedded abrasive particles 28.

Figure 4:
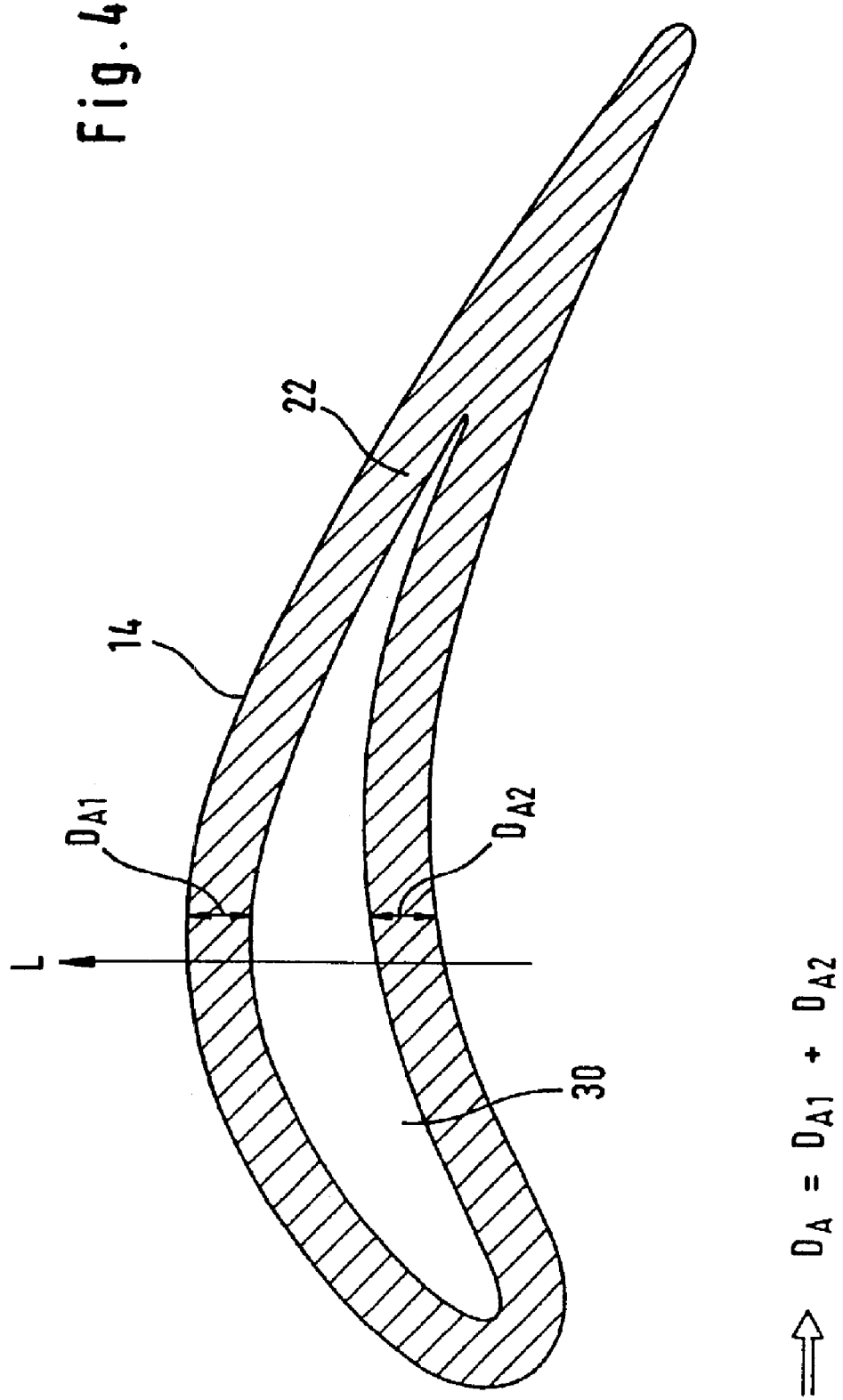
FIG. 4 illustrates the determination of the effective length of the abrasive coating at a blade tip having a blade crown.

If blade section 14 has zones without abrasive coating 30 at blade tip 12, e.g., depressions for cooling the blade (cooling-air bores or so-called blade crown), then, as illustrated in FIG. 4, effective length $D_A$ of the abrasive coating is determined by adding up the partial lengths, provided with abrasive coating 22.

As explained above, the wear of abrasive coating 22 is a function of effective length $D_A$ of abrasive coating 22, given otherwise constant conditions such as mating of materials, temperature, rotational speed, etc. If effective length $D_A$ of abrasive coating 22 falls below a predefined minimum dimension, which is referred to below as $D_{A,min}$, then an increased wear of abrasive coating 22 may be expected. Predefined, minimum dimension $D_{A,min}$ is a turbine-specific parameter, which results from the specific turbine design.

Figure 5:
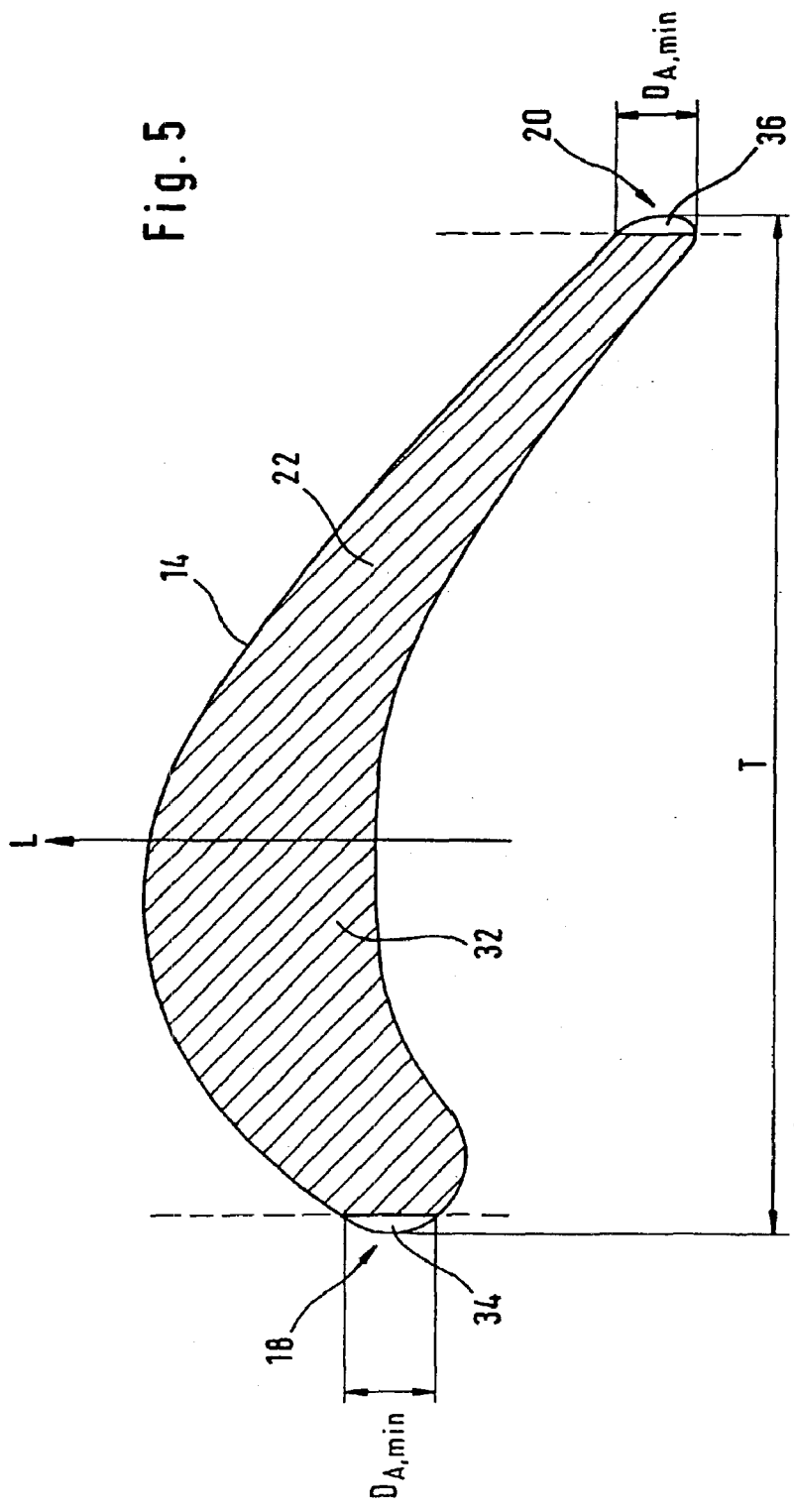
FIG. 5 illustrates the section of a blade tip having the depressions of the present invention in the region of the leading and trailing edges.
Figure 8:
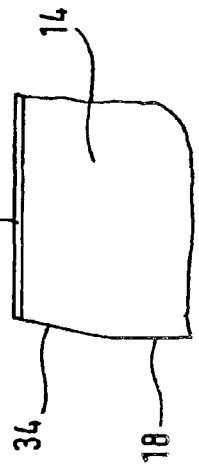
FIG. 8 is a detailed view of the flattened area in the region of the leading edge illustrated in FIG. 5.

An exemplary embodiment, in which the stipulation of the present invention that effective length $D_A$ is very frequently greater than, but at least equal to predefined, minimum dimension $D_{A,min}$ is satisfied, is illustrated in FIG. 5. For present turbine blade 10, it is known from the turbine design that predefined, minimum dimension $D_{A,min}=2$ mm ($\pm 0.5$ mm) at blade tip 12, i.e., that, at the blade tip, effective length $D_A$ is very frequently greater than but at least equal to predefined, minimum dimension $D_{A,min}=2$ mm ($\pm 0.5$ mm). For this purpose, at blade tip 12, blade section 14 has, in addition to a middle region 32 provided with abrasive coating 22, a flattened area 34 in the region of leading-edge 18 and a flattened area 36 in the region of trailing edge 20. In this context, flattened areas 34 and 36 positioned in parallel with direction of travel L of turbine blade 10 are arranged in such a manner that, in each edge region between middle region 32 and depressed regions 34, 36, the requirement $D_A \geq D_{A,min}$ is satisfied. Since, along section depth T, blade tip 12 may only come into "contact" with the surrounding abrasion coating (liner) via middle region 32, premature wear of abrasive coating 22 may be consequently precluded in the region of leading and trailing edges 18, 20. To this end, see also the detail in the direction of travel illustrated in FIG. 8.

Figure 6:
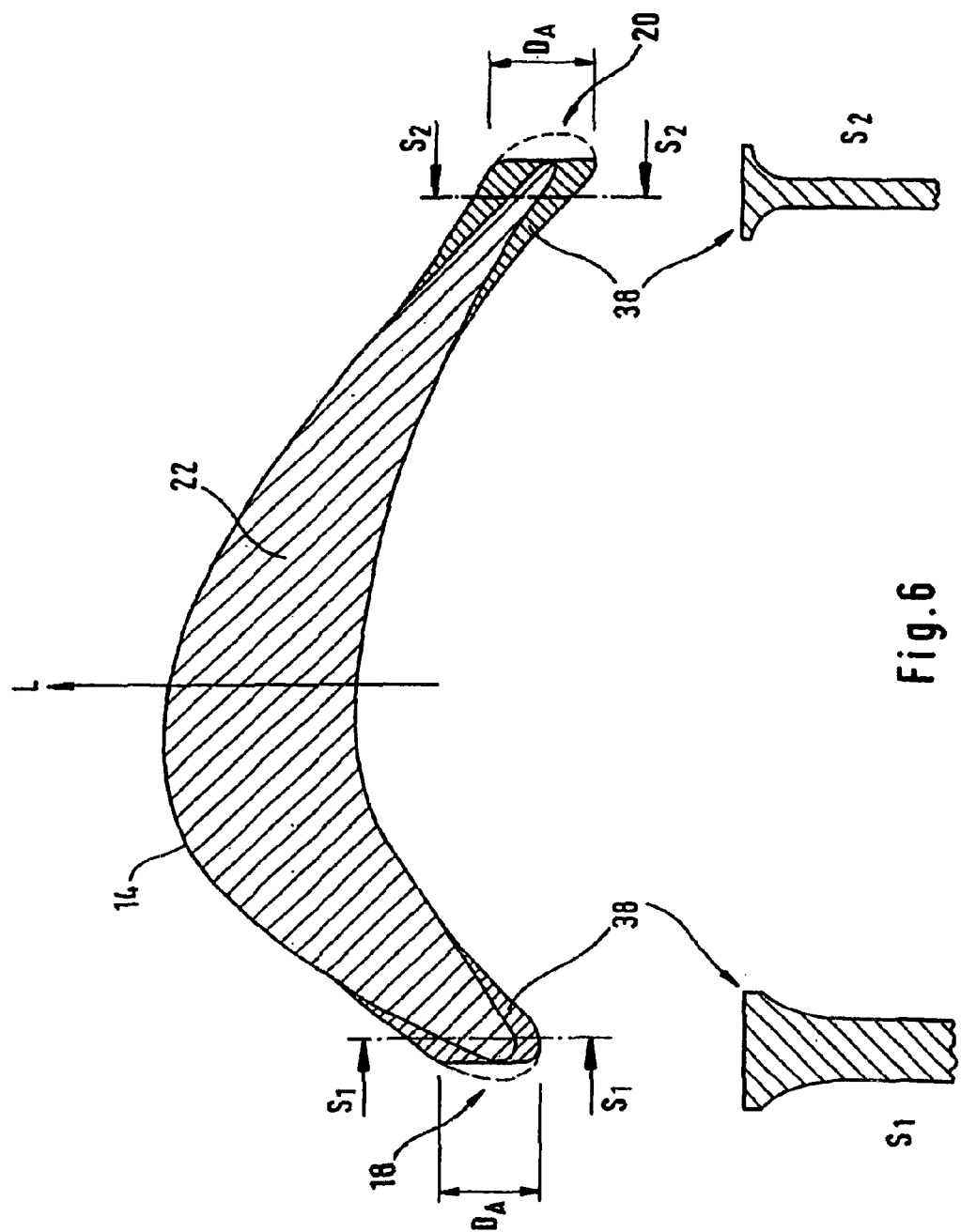
FIG. 6 illustrates a further section of a blade tip having covering bands present at the leading and trailing edges.

An additional exemplary embodiment of the present invention is illustrated in FIG. 6. The requirement of the present invention that, in the region of leading and trailing edges 18, 20, effective length $D_A$ of abrasive coating 22 very frequently be greater than, but at least equal to predefined, minimum dimension $D_{A,min}$, may be achieved by providing a covering band 38 locally bounded in direction of travel L of turbine blade 10. In contrast to conventional covering bands, covering bands 38 may only be provided in the region of the leading and trailing edges, but not in the rest of the section region. In addition, abrasive coating 22 is applied to covering bands 38 in this case.

Figure 7:
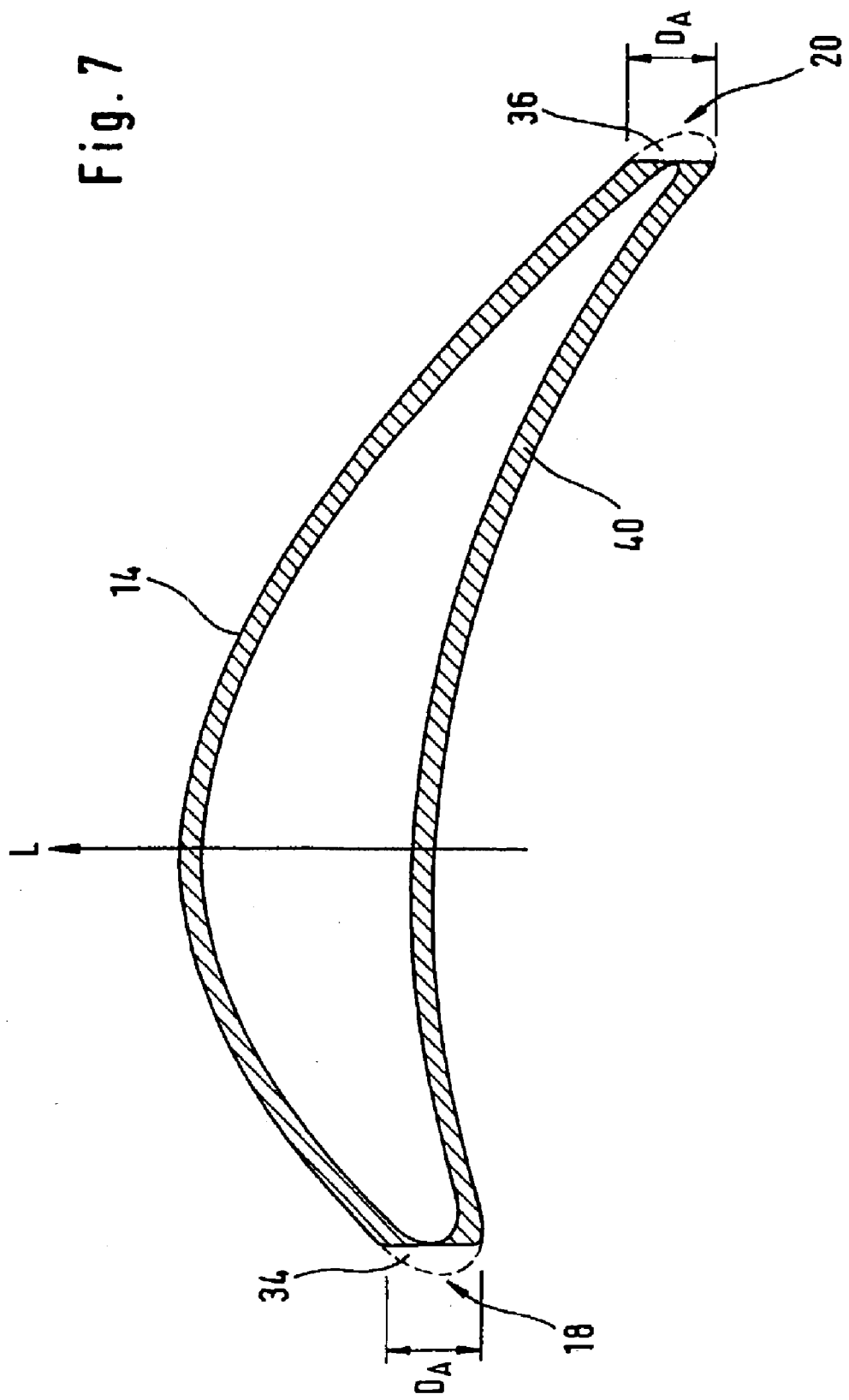
FIG. 7 illustrates a further section of a blade tip, having a combination of circumferential covering bands and depressions at the leading and trailing edges.

A combination of the above-described measures of the present invention is illustrated in FIG. 7. In this context, blade section 14 has a covering band 40 at blade tip 12, which encircles blade section 14 along its profile and is locally bounded in direction of travel L of turbine blade 10. In combination with this, the region around leading and trailing edges 18, 20 is additionally provided with flattened areas 34, 36. Furthermore, covering bands 38 do not have any straight edges, but rather an edge shape following the contour of the section. Since covering band 40 is locally bounded in direction of travel L of turbine blade 10, the individual covering bands may be precluded from making contact with each other. Covering band 40 may provide that a design of leading and trailing edges 18, 20 optimized according to thermodynamic and aerodynamic criteria (e.g., thin) may be made easier.

What is claimed is:

1. A turbine blade for a gas-turbine engine impeller rotationally mounted in a housing, comprising:
   a blade tip;
   a leading edge arranged upstream in a direction of flow;
   a trailing edge arranged downstream in the direction of flow;
   a blade section having a section depth parallel to the direction of flow and a section thickness parallel to a direction of travel of the turbine blade; and
   an abrasive coating provided on the blade tip and having an effective length corresponding to the section thickness along the section depth;
   wherein the blade tip with the abrasive coating is configured to brush against an abrasion coating provided on a surrounding housing, the abrasive coating provided on the blade tip arranged to contact the abrasion coating having an effective length along the section depth greater than and at least equal to a predefined, minimum dimension;
   wherein the abrasive coating has a flattened area in a region of at least one of the leading edge and the trailing edge, the flattened area substantially parallel to the direction of travel of the turbine blade and substantially perpendicular to the direction of flow.

2. The turbine blade according to claim 1, wherein the effective length of the flattened area is greater than and at least equal to the predefined, minimum dimension.

3. The turbine blade according to claim 1, wherein along the section depth, the predefined, minimum dimension of the effective length of the abrasive coating is exceeded at the blade tip in accordance with the flattened area in a region of the leading edge and the trailing edge parallel to the direction of travel of the turbine blade.

4. The turbine blade according to claim 1, further comprising at least one covering band locally bounded in the direction of travel of the turbine blade arranged in a region of the leading edge and the trailing edge, along the section depth, the predefined, minimum dimension of the effective length of the abrasive coating exceeded at the blade tip by the covering band.

5. The turbine blade according to claim 4, wherein the covering band includes an abrasive coating.

6. The turbine blade according to claim 4, wherein edges of the covering bands are arranged to follow a contour of the blade section on the blade tip.

7. The turbine blade according to claim 1, further comprising at least one covering band extending along a circumference of the blade section and locally bounded in the direction of travel of the turbine blade, along the section depth, the effective length of the abrasive coating at the blade tip exceeding the predefined, minimum dimension ensured by the covering band.

8. The turbine blade according to claim 7, wherein the covering band includes an abrasive coating.

9. The turbine blade according to claim 7, wherein edges of the covering bands are arranged to follow a contour of the blade section on the blade tip.

10. The turbine blade according to claim 1, further comprising at least one covering band extending around the blade section, along the section depth, the effective length of the abrasive coating at the blade tip exceeding the predefined, minimum dimension ensured by the flattened area and the covering band.

11. The turbine blade according to claim 10, wherein the covering band includes an abrasive coating.

12. A turbine blade for a gas-turbine engine impeller rotationally mounted in a housing, comprising:
   a blade tip;
   a leading edge arranged upstream in a direction of flow;
   a trailing edge arranged downstream in the direction of flow;
   a blade section having a section depth parallel to the direction of flow and a section thickness parallel to a direction of travel of the turbine blade; and
   an abrasive coating provided on the blade tip and having an effective length corresponding to the section thickness along the section depth;
   wherein the blade tip with the abrasive coating is configured to brush against an abrasion coating provided on a surrounding housing, the abrasive coating provided on the blade tip arranged to contact the abrasion coating having an effective length along the section death greater than and at least equal to a predefined, minimum dimension;
   the turbine blade further comprising a flattened area in a region of at least one of the leading edge and the trailing edge and covering bands arranged in the region of the leading edge and trailing edge, along the section depth, the effective length of the abrasive coating at the blade tip exceeding the predefined, minimum dimension ensured by the flattened area and the covering bands.

13. The turbine blade according to claim 12, wherein the covering bands include an abrasive coating.

14. The turbine blade according to claim 12, wherein the covering bands are arranged together without contact.

15. The turbine blade according to claim 12, wherein edges of the covering bands are arranged to follow a contour of the blade section of the blade tip.

16. A turbine blade for a gas-turbine engine impeller rotationally mounted in a housing, comprising:
   a blade tip;
   a leading edge arranged upstream in a direction of flow;
   a trailing edge arranged downstream in the direction of flow;

a blade section having a section depth parallel to the direction of flow and a section thickness parallel to a direction of travel of the turbine blade; and an abrasive coating provided on the blade tip and having an effective length corresponding to the section thickness along the section depth;

wherein the blade tip with the abrasive coating is configured to brush against an abrasion coating provided on a surrounding housing, the abrasive coating provided on the blade tip arranged to contact the abrasion coating having an effective length along the section depth greater than and at least equal to a predefined, minimum dimension;

the turbine blade further comprising at least one covering band locally bounded in the direction of travel of the turbine blade arranged in a region of the leading edge and the trailing edge, along the section depth, the predefined, minimum dimension of the effective length of the abrasive coating exceeded at the blade tip by the covering band;

wherein the covering bands are arranged together without contact.

17. A turbine blade for a gas-turbine engine impeller rotationally mounted in a housing, comprising:

a blade tip;

a leading edge arranged uDstream in a direction of flow;

a trailing edge arranged downstream in the direction of flow;

a blade section having a section depth parallel to the direction of flow and a section thickness parallel to a direction of travel of the turbine blade; and an abrasive coating provided on the blade tip and having an effective length corresponding to the section thickness along the section depth;

wherein the blade tip with the abrasive coating is configured to brush against an abrasion coating provided on a surrounding housing, the abrasive coating provided on the blade tip arranged to contact the abrasion coating having an effective length along the section depth greater than and at least equal to a predefined, minimum dimension;

the turbine blade further comprising at least one covering band extending along a circumference of the blade section and locally bounded in the direction of travel of the turbine blade, along the section depth, the effective length of the abrasive coating at the blade tip exceeding the predefined, minimum dimension ensured by the covering band;

wherein the covering bands are arranged together without contact.

18. A turbine blade for a gas-turbine engine impeller rotationally mounted in a housing, comprising:

a blade tip;

a leading edge arranged upstream in a direction of flow;

a trailing edge arranged downstream in the direction of flow;

a blade section having a section depth parallel to the direction of flow and a section thickness parallel to a direction of travel of the turbine blade; and an abrasive coating provided on the blade tip and having an effective length corresponding to the section thickness along the section depth;

wherein the blade tip with the abrasive coating is configured to brush against an abrasion coating provided on a surrounding housing, the abrasive coating provided on the blade tip arranged to contact the abrasion coating having an effective length along the section depth greater than and at least equal to a predefined, minimum dimension;

the turbine blade further comprising a flattened area in a region of at least one of the leading edge and the trailing edge and at least one covering band extending around the blade section, along the section depth, the effective length of the abrasive coating at the blade tip exceeding the predefined, minimum dimension ensured by the flattened area and the covering band;

wherein the covering bands are arranged together without contact.

19. A turbine blade for a gas-turbine engine impeller rotationally mounted in a housing, comprising:

a blade tip;

a leading edge arranged upstream in a direction of flow;

a trailing edge arranged downstream in the direction of flow;

a blade section having a section depth parallel to the direction of flow and a section thickness parallel to a direction of travel of the turbine blade; and an abrasive coating provided on the blade tip and having an effective length corresponding to the section thickness along the section depth;

wherein the blade tip with the abrasive coating is configured to brush against an abrasion coating provided on a surrounding housing, the abrasive coating provided on the blade tip arranged to contact the abrasion coating having an effective length along the section depth greater than and at least equal to a predefined, minimum dimension;

the turbine blade further comprising a flattened area in a region of at least one of the leading edge and the trailing edge and at least one covering band extending around the blade section, along the section depth, the effective length of the abrasive coating at the blade tip exceeding the predefined, minimum dimension ensured by the flattened area and the covering band;

wherein edges of the covering bands are arranged to follow a contour of the blade section of the blade tip.

* * * * *

UNITED STATES PATENT AND TRADEMARK OFFICE
CERTIFICATE OF CORRECTION

| | |
|---|---|
| PATENT NO. | : 6,984,107 B2 |
| APPLICATION NO. | : 10/351873 |
| DATED | : January 10, 2006 |
| INVENTOR(S) | : Grunke et al. |

It is certified that error appears in the above-identified patent and that said Letters Patent is hereby corrected as shown below:

Column 2,
Line 64, change "the leading-and trailing edges" to -- the leading and trailing edges --;

Column 6,
Line 44, change "along the section death" to -- along the section depth --; and Column 7,
Line 27, change "arranged uDstream" to -- arrange upstream --.

Signed and Sealed this

Twentieth Day of June, 2006

JON W. DUDAS
*Director of the United States Patent and Trademark Office*